United States Patent
Kimura et al.

(10) Patent No.: US 10,780,912 B2
(45) Date of Patent: Sep. 22, 2020

(54) STEERING DEVICE

(71) Applicant: JTEKT CORPORATION, Osaka-shi, Osaka (JP)

(72) Inventors: Yuta Kimura, Nagoya (JP); Hiroaki Murakami, Yokohama (JP)

(73) Assignee: JTEKT CORPORATION, Osaka (JP)

( * ) Notice: Subject to any disclaimer, the term of this patent is extended or adjusted under 35 U.S.C. 154(b) by 179 days.

(21) Appl. No.: 16/027,610

(22) Filed: Jul. 5, 2018

(65) Prior Publication Data

US 2019/0016372 A1    Jan. 17, 2019

(30) Foreign Application Priority Data

Jul. 12, 2017  (JP) ................................. 2017-136082
Dec. 20, 2017  (JP) ................................. 2017-244131

(51) Int. Cl.
*B62D 5/04*     (2006.01)
*B62D 3/08*     (2006.01)
*B62D 3/12*     (2006.01)

(52) U.S. Cl.
CPC ............. *B62D 5/0406* (2013.01); *B62D 3/08* (2013.01); *B62D 3/126* (2013.01); *B62D 5/0424* (2013.01); *B62D 5/0448* (2013.01); *B62D 5/0454* (2013.01)

(58) Field of Classification Search
CPC ........ B62D 5/0406; B62D 3/08; B62D 3/126; B62D 5/0424; B62D 5/0448; B62D 5/0454

See application file for complete search history.

(56) References Cited

U.S. PATENT DOCUMENTS

| 4,825,972 A * | 5/1989 | Shimizu | B62D 5/0466 180/444 |
| 6,454,044 B1 * | 9/2002 | Menjak | B62D 5/0424 180/444 |
| 6,662,897 B2 * | 12/2003 | Tatewaki | B62D 5/0424 180/444 |

(Continued)

FOREIGN PATENT DOCUMENTS

| DE | 10 2013 112776 A1 | 5/2015 |
| JP | 2015 174615 | * 10/2015 |
| JP | 2015-174615 A | 10/2015 |

OTHER PUBLICATIONS

Dec. 6, 2018 Extended Search Report issued in European Patent Application No. 18182374.1.

*Primary Examiner* — Tony H Winner
*Assistant Examiner* — Michael R Stabley
(74) *Attorney, Agent, or Firm* — Oliff PLC

(57) ABSTRACT

A steering device includes: a rack shaft; a rack housing housing the rack shaft; a motor unit having a motor case of which one end is coupled to the rack housing; a moving force application mechanism that moves the rack shaft by an output of the motor unit; and a support member that is fixed to the rack housing and supports the motor case. The rack housing has a fixing projection in which a bolt hole extending in a height direction is formed. The support member has an arc-shaped support part that extends along an outer circumferential surface of the motor case, and a pair of fixing pieces that protrudes from the support part toward a rack shaft housing section. Ends of the pair of fixing pieces are fastened with a bolt to the fixing projection of the rack housing.

8 Claims, 10 Drawing Sheets

(56) References Cited

U.S. PATENT DOCUMENTS

| | | | | |
|---|---|---|---|---|
| 6,702,060 | B2* | 3/2004 | Tatewaki | B62D 5/0424 |
| | | | | 180/444 |
| 6,860,360 | B2* | 3/2005 | Tatewaki | H02K 5/24 |
| | | | | 180/444 |
| 6,938,722 | B2* | 9/2005 | Sasaki | B62D 5/0424 |
| | | | | 180/443 |
| 7,278,334 | B2* | 10/2007 | Saruwatari | B62D 5/0412 |
| | | | | 180/444 |
| 7,284,634 | B2* | 10/2007 | Tatewaki | B62D 5/0424 |
| | | | | 180/443 |
| 8,950,543 | B2* | 2/2015 | Heo | B62D 5/04 |
| | | | | 180/444 |
| 9,428,218 | B2* | 8/2016 | Yamamoto | F16K 15/144 |
| 9,446,788 | B2* | 9/2016 | Yamaguchi | F16H 25/2223 |
| 2002/0148672 | A1* | 10/2002 | Tatewaki | B62D 5/0424 |
| | | | | 180/443 |
| 2003/0188918 | A1* | 10/2003 | Shimizu | B62D 5/0424 |
| | | | | 180/444 |
| 2015/0251689 | A1* | 9/2015 | Tajima | B62D 5/0403 |
| | | | | 180/444 |
| 2017/0097067 | A1* | 4/2017 | Yamamoto | B62D 3/12 |
| 2017/0282965 | A1* | 10/2017 | Sekikawa | B62D 5/0403 |

* cited by examiner

STEERING DEVICE

INCORPORATION BY REFERENCE

The disclosure of Japanese Patent Application No. 2017-136082 filed on Jul. 12, 2017 and No. 2017-244131 filed on Dec. 20, 2017 including the specification, drawings and abstract, is incorporated herein by reference in its entirety.

BACKGROUND OF THE INVENTION

1. Field of the Invention

The present invention relates to a steering device.

2. Description of the Related Art

Conventionally, a steering device including an electrically-operated steering assistance device that assists a driver with a steering operation by applying a moving force acting in an axial direction to a rack shaft, which is a steering axle, is widely used for vehicles like so-called hybrid vehicles and electric vehicles that have an electric motor as a driving source for propulsion. The steering assistance device has a motor unit of which an output shaft rotates with a torque according to a steering torque, and a rotary force of the output shaft is converted into a linear moving force by a ball screw mechanism etc. and transmitted to the rack shaft. The rack shaft is supported by a cylindrical rack housing, and steers steered wheels by advancing and retracting in a vehicle width direction.

The motor unit has a rotor that rotates integrally with the output shaft and a stator that generates a magnetic field, and these rotor and stator, along with a controller, are housed inside a motor case, of which one end is fixed with bolts to the rack housing. Such a motor unit not only has a relatively large mass but also is fixed at one end in an axial direction thereof to the rack housing, which makes it susceptible to vibration of the vehicle. Thus, if the strength with which the motor case is fixed to the rack housing is low, damage to the rack housing and the motor case or abnormal noise may occur.

Japanese Patent Application Publication No. 2015-174615 (JP 2015-174615 A; see paragraphs [0036] to [0038] and FIG. 4) describes a steering device in which a motor case is coupled to a gear housing, which corresponds to a rack housing, with a a-shaped coupling member. This coupling member has a pair of contact parts that is fastened with bolts engaging in internally threaded holes of ribs formed on the gear housing, a pair of leg parts that extends respectively from ends of the pair of contact parts toward the motor case, and a fastening part that extends from ends of the pair of leg parts along an outer circumferential surface of the motor case. The contact parts extend in a vehicle length direction, and the leg parts extend in a vehicle height direction.

In the steering device described in JP 2015-174615 A, the contact part and the leg part of the coupling member form a right angle, so that stress is likely to concentrate at a corner therebetween when the motor unit vibrates. Thus, there is concern that the fatigue strength of the coupling member may be low, and that the stiffness with which the motor unit is supported may not necessarily be sufficient.

SUMMARY OF THE INVENTION

One object of the present invention is to provide a steering device that allows a motor case to be supported on a housing with higher support stiffness by a support member.

A steering device of one aspect of the present invention includes: a steering axle that steers steered wheels of a vehicle by advancing and retracting in an axial direction; a housing having a cylindrical main part that houses a part of the steering axle; a motor unit that is disposed at a predetermined distance from the main part of the housing, and has a motor case of which one end in a direction parallel to the steering axle is fixed to the housing; a moving force application mechanism that applies a moving force acting in the axial direction to the steering axle resulting from rotation of an output shaft of the motor unit; and a support member that is fixed to a fixing projection provided on the housing and supports the motor case, wherein the fixing projection protrudes from the main part toward the motor unit, and has a bolt hole extending in a height direction of the vehicle, and wherein the support member has an arc-shaped support part that is disposed along an outer circumferential surface of the motor case, and a fixing piece that protrudes from the support part toward the main part of the housing, and an end of the fixing piece is fastened with a bolt to an open end surface of the fixing projection in which the bolt hole opens.

The steering device according to the present invention allows the motor case to be supported on the housing with higher support stiffness by the support member.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
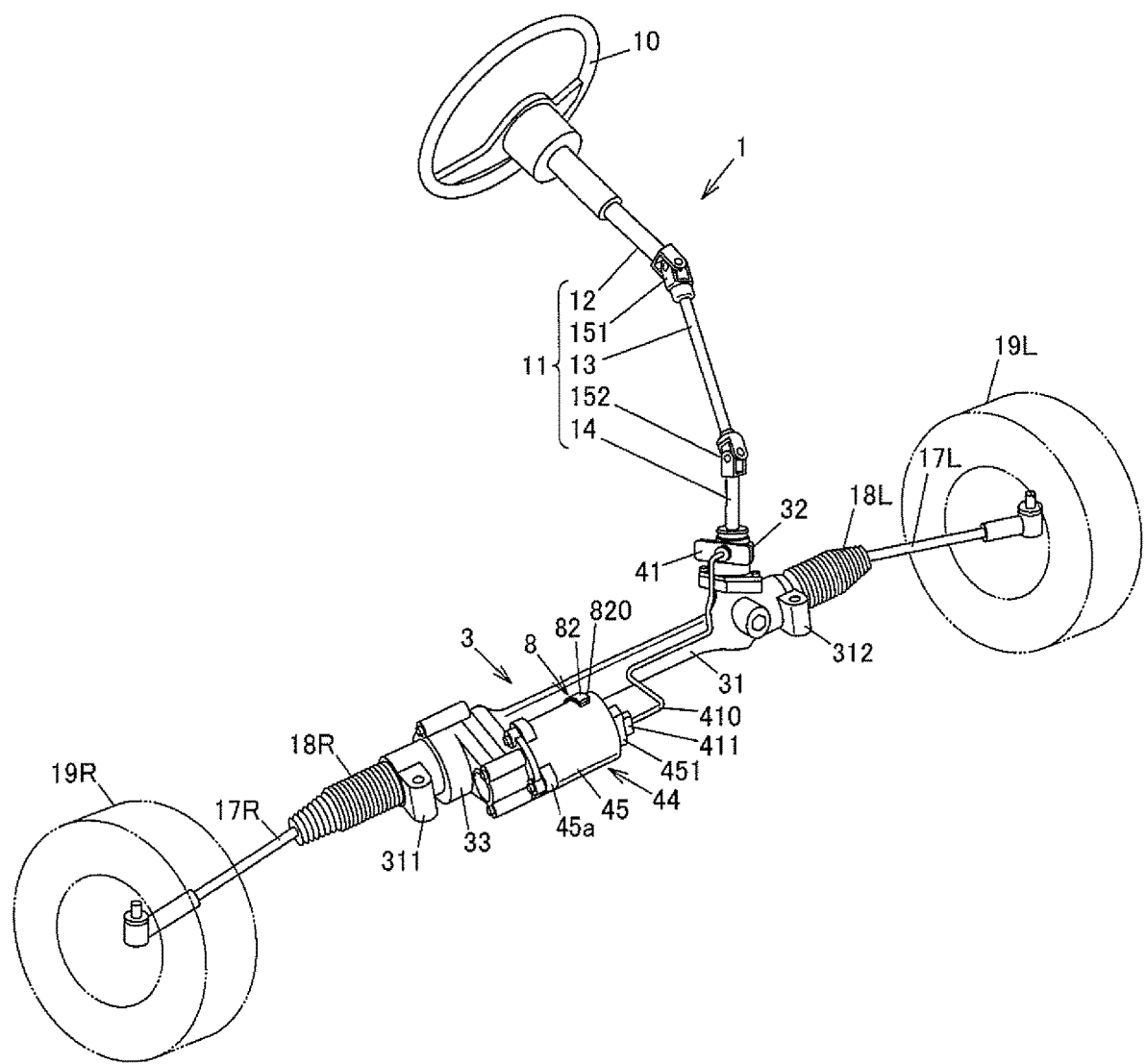
FIG. 1 is an external view showing a steering device according to a first embodiment of the present invention.
Figure 2:
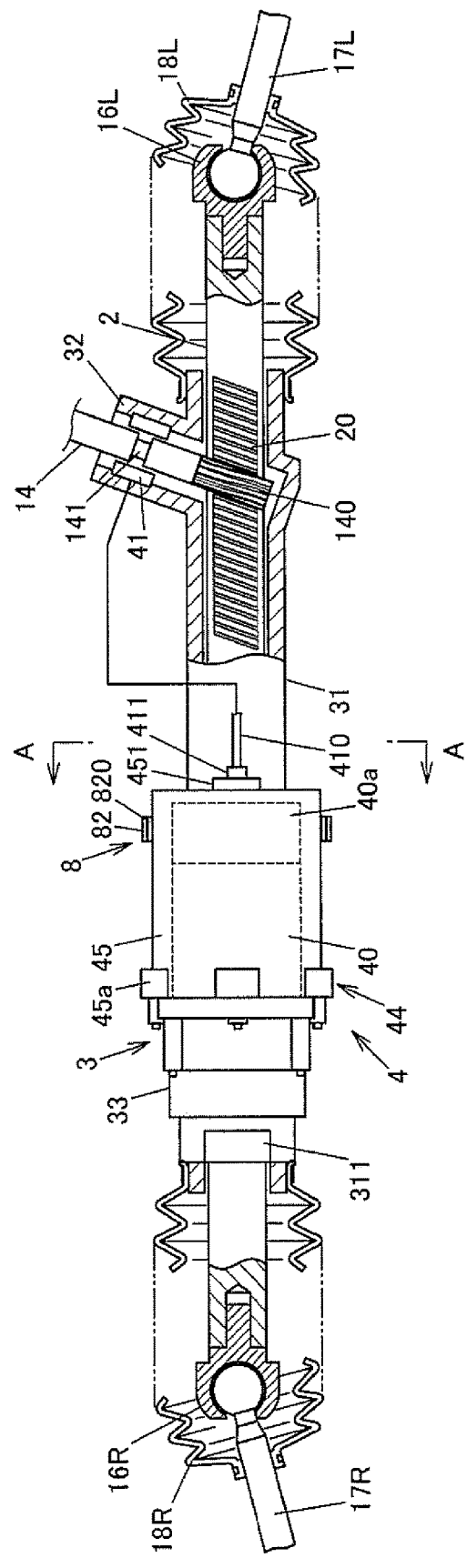
FIG. 2 is a schematic view schematically showing the structure inside a housing of the steering device.
Figure 3:
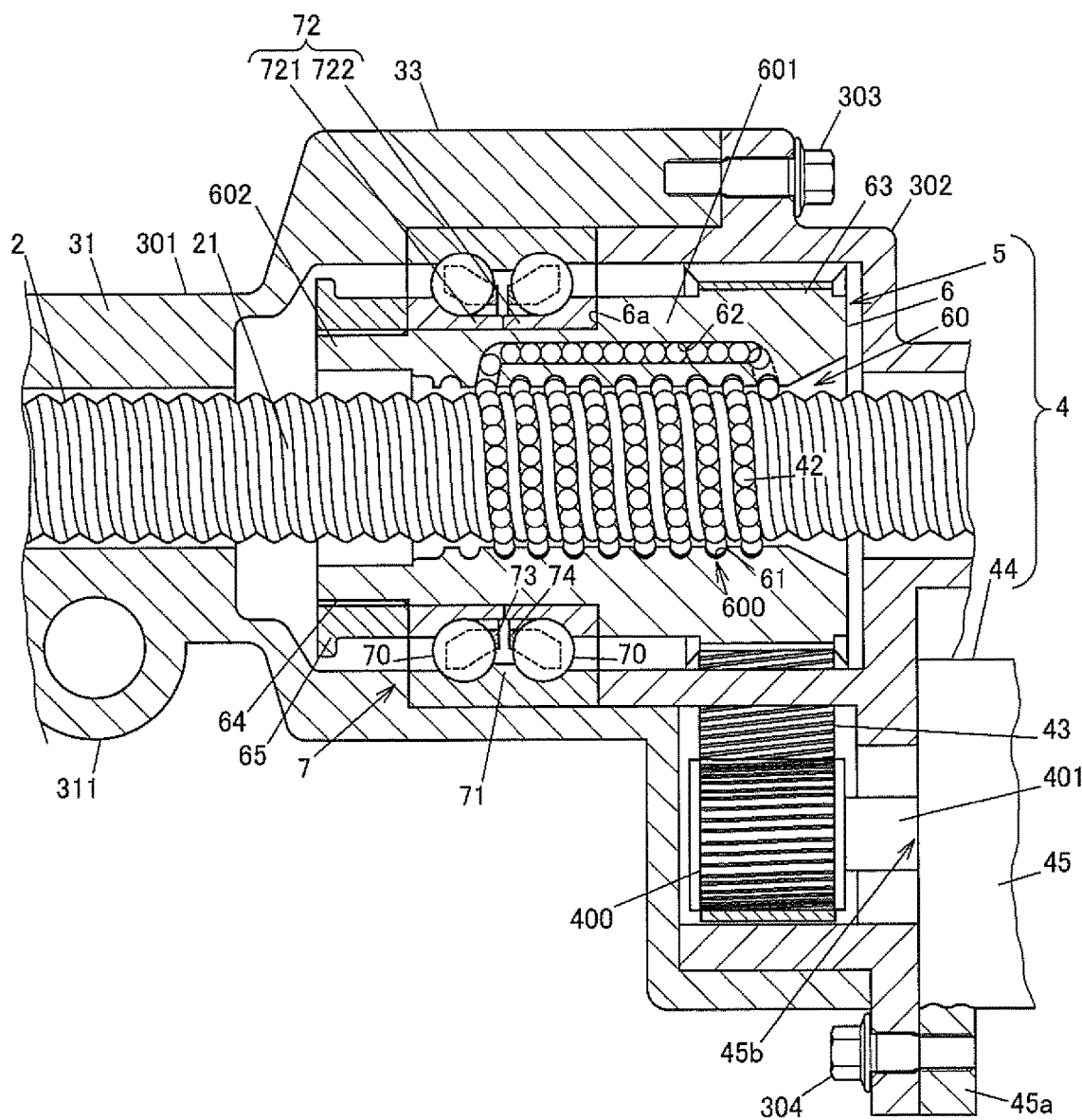
FIG. 3 is a sectional view showing the configuration of a main part of a steering assistance device.

A first embodiment of the present invention will be described with reference to FIG. 1 to FIG. 5. FIG. 1 is an external view showing the overall configuration of a steering device according to the first embodiment of the present invention. FIG. 2 is a schematic view schematically showing the structure inside a housing of the steering device. FIG. 3 is a sectional view showing the configuration of a main part of a steering assistance device.

The steering device 1 is mounted in a vehicle and steers right and left front wheels, which are steered wheels, in response to a steering operation of a driver. FIG. 1 shows the steering device as seen from an obliquely front side of the vehicle, with the right and left sides of FIG. 1 corresponding respectively to the left and right sides of the vehicle. The letters R and L in the reference signs in FIG. 1 and FIG. 2 respectively indicate the right and left sides of the vehicle. In the following description, upper and lower sides and right and left sides refer to these sides in a vehicle height direction (vertical direction) and a vehicle lateral direction (vehicle width direction), respectively.

The steering device 1 includes: a steering shaft 11 coupled to a steering wheel 10 by which the driver performs a steering operation; a rack shaft 2 as a steering axle that advances and retracts in an axial direction along the vehicle width direction according to a steering operation of the steering wheel 10; a rack housing (housing) 3 housing the rack shaft 2; a motor unit 44 having an electric motor 40 that is composed of a stator and a rotor, and a control unit 40a as a controller that controls the electric motor 40, both housed inside a motor case 45; and a moving force application mechanism 5 that is driven by the electric motor 40 and applies a moving force acting in the axial direction to the rack shaft 2.

The rack housing 3 houses the moving force application mechanism 5 and a part of the rack shaft 2. Both ends of the rack shaft 2 in a longitudinal direction thereof protrude from the rack housing 3. The motor unit 44 and the moving force application mechanism 5 constitute a steering assistance device 4 that assists the driver with a steering operation of the steering wheel 10. The steering device 1 steers right and left front wheels 19R, 19L, which are steered wheels, by advancing and retracting the rack shaft 2 in the axial direction. In FIG. 1, the front wheels 19R, 19L are indicated by the hidden outlines (long dashed double-short dashed lines).

The steering shaft 11 has a column shaft 12 with the steering wheel 10 fixed to one end, an intermediate shaft 13 coupled to the column shaft 12 through a universal joint 151, and a pinion shaft 14 coupled to the intermediate shaft 13 through a universal joint 152. For example, the universal joints 151, 152 are Cardan joints.

Pinion teeth 140 (see FIG. 2) are formed at a leading end of the pinion shaft 14. Rack teeth 20 meshing with the pinion teeth 140, and a spiral groove 21 (see FIG. 3) are formed in the rack shaft 2. A part of the pinion shaft 14 is formed as a torsion bar 141 having flexibility that is twisted by a steering torque applied to the steering wheel 10, and the twist angle of the torsion bar 141 is detected by a torque sensor 41. The torque sensor 41 detects the steering torque by the size of the twist angle of the torsion bar 141.

The rack shaft 2 is coupled to the right and left front wheels 19R, 19L through a link mechanism including right and left tie rods 17R, 17L and knuckle arms (not shown). Telescopic bellows 18R, 18L having an accordion structure that are flexible are provided respectively between one end of the rack housing 3 and the tie rod 17R and between the other end of the rack housing 3 and the tie rod 17L. As shown in FIG. 2, ends of the right and left tie rods 17R, 17L are coupled respectively to both ends of the rack shaft 2 through ball joints 16R, 16L. When the rack shaft 2 advances or retracts in the vehicle width direction (lateral direction), the directions of the right and left front wheels 19R, 19L are changed respectively by the right and left tie rods 17R, 17L.

In this embodiment, the moving force application mechanism 5 is formed by a ball screw mechanism. The moving force application mechanism 5 has a cylindrical nut member 6 that engages in the groove 21 formed in an outer circumferential surface of the rack shaft 2 through a plurality of balls 42, and a rolling bearing 7 that rotatably supports the nut member 6.

The control unit 40a of the motor unit 44 supplies the electric motor 40 with a steering torque detected by the torque sensor 41 and with a motor current according to a vehicle speed. A detection signal of the torque sensor 41 is transferred to the control unit 40a through a cable 410. A connector 451 mating with a connector 411 attached at one end of the cable 410 is fixed to the motor case 45. The electric motor 40 generates a torque by a motor current supplied from the control unit 40a to the stator, and thereby rotates the nut member 6 relative to the rack housing 3 through a belt 43 made of synthetic rubber.

The rack housing 3 is formed by aluminum die casting, for example, and integrally has: a cylindrical rack shaft housing section 31 as a main body housing a part of the rack shaft 2; a pinion shaft housing section 32 housing the pinion shaft 14; a nut member housing section 33 housing the nut member 6; and a fixing projection 34 for fixing the support member 8 to be described later. The rack shaft housing section 31 houses and supports the rack shaft 2, except for both ends thereof, so as to be movable in the axial direction. The rack shaft housing section 31 has mounting portions 311, 312 (see FIG. 1) respectively at both ends in the axial direction, and the mounting portions 311, 312 are fixed with bolts to a steering member (not shown) of a vehicle body on which the steering device 1 is to be mounted.

The rack housing 3 has a first member 301 and a second member 302. The nut member housing section 33 is formed by joining together the first member 301 and the second member 302. A part of the rack shaft housing section 31 that is located on the right side of the vehicle (the left side in FIG. 1) from the nut member housing section 33 is formed by the first member 301. A part of the rack shaft housing section 31 that is located on the left side of the vehicle (the right side in FIG. 1) from the nut member housing section 33 is formed by the second member 302. The first member 301 and the second member 302 are fastened together with a plurality of bolts 303.

The motor case 45 housing the electric motor 40 has an opening 45b at one end, and a shaft 401 that is the output shaft of the electric motor 40 protrudes through the opening 45b. A flange-shaped coupling portion 45a is formed on an outer circumference of the end of the motor case 45 on the side of the opening 45b, and the coupling portion 45a is fixed to the second member 302 with a plurality of bolts 304. Thus, the one end of the motor case 45 in a direction parallel to the rack shaft 2 is fixed with the bolts 304 to the rack housing 3. In FIG. 3, one bolt 303 of the plurality of bolts 303 and one bolt 304 of the plurality of bolts 304 are shown.

The nut member 6 forms a ball screw unit 60 along with the rack shaft 2. A spiral groove 61 facing the groove 21 of the rack shaft 2 is formed in an inner circumferential surface of the nut member 6. The plurality of balls 42 rolls on a rolling path 600 formed by the groove 21 of the rack shaft 2 and the groove 61 of the nut member 6. A return path 62 opening at two locations in the rolling path 600 is formed in the nut member 6. The plurality of balls 42 circulates through the rolling path 600 and the return path 62 as the nut member 6 rotates.

The nut member 6 has an idler pulley portion 63 around which the belt 43 is wrapped. The belt 43 is wrapped across a drive pulley 400 joined to the shaft 401 of the electric motor 40 and the idler pulley portion 63, and transmits a rotary force of the electric motor 40 to the nut member 6. As the shaft 401 that is the output shaft of the electric motor 40 rotates, the moving force application mechanism 5 applies a moving force acting in the axial direction to the rack shaft 2.

The motor case 45 and the rack shaft housing section 31 of the rack housing 3 are disposed with a predetermined space left therebetween in a vehicle length direction, so as to face each other in the vehicle length direction. In this embodiment, a central axis of the rack shaft 2 and a central axis of the electric motor 40 are parallel to each other. In other words, the shaft 401 that is the output shaft of the electric motor 40 is disposed with a rotational axis thereof oriented parallel to the central axis of the rack shaft 2.

The rolling bearing 7 is a double-row ball bearing having a plurality of rolling elements 70 disposed in two rows, and has an outer ring 71, an inner ring 72, and first and second cages 73, 74. The outer ring 71 is fixed to the rack housing 3. The inner ring 72 is composed of a first inner ring member 721 along which a plurality of rolling elements 70 in a first row rolls, and a second inner ring member 722 along which a plurality of rolling elements 70 in a second row rolls.

The nut member 6 integrally has a large-diameter part 601 and a small-diameter part 602 that are different in outside diameter from each other, and the idler pulley portion 63 is formed at one end of the large-diameter part 601. A step surface 6a is formed between the large-diameter part 601 and the small-diameter part 602. An external thread 64 is formed on an outer circumferential surface of one end of the small-diameter part 602, and a ring nut 65 is engaged with the external thread 64. The ring nut 65 is prevented from loosening, for example, by riveting, and fixes the inner ring 72 by fastening the inner ring 72 in the axial direction between the ring nut 65 and the step surface 6a.

Figure 4:
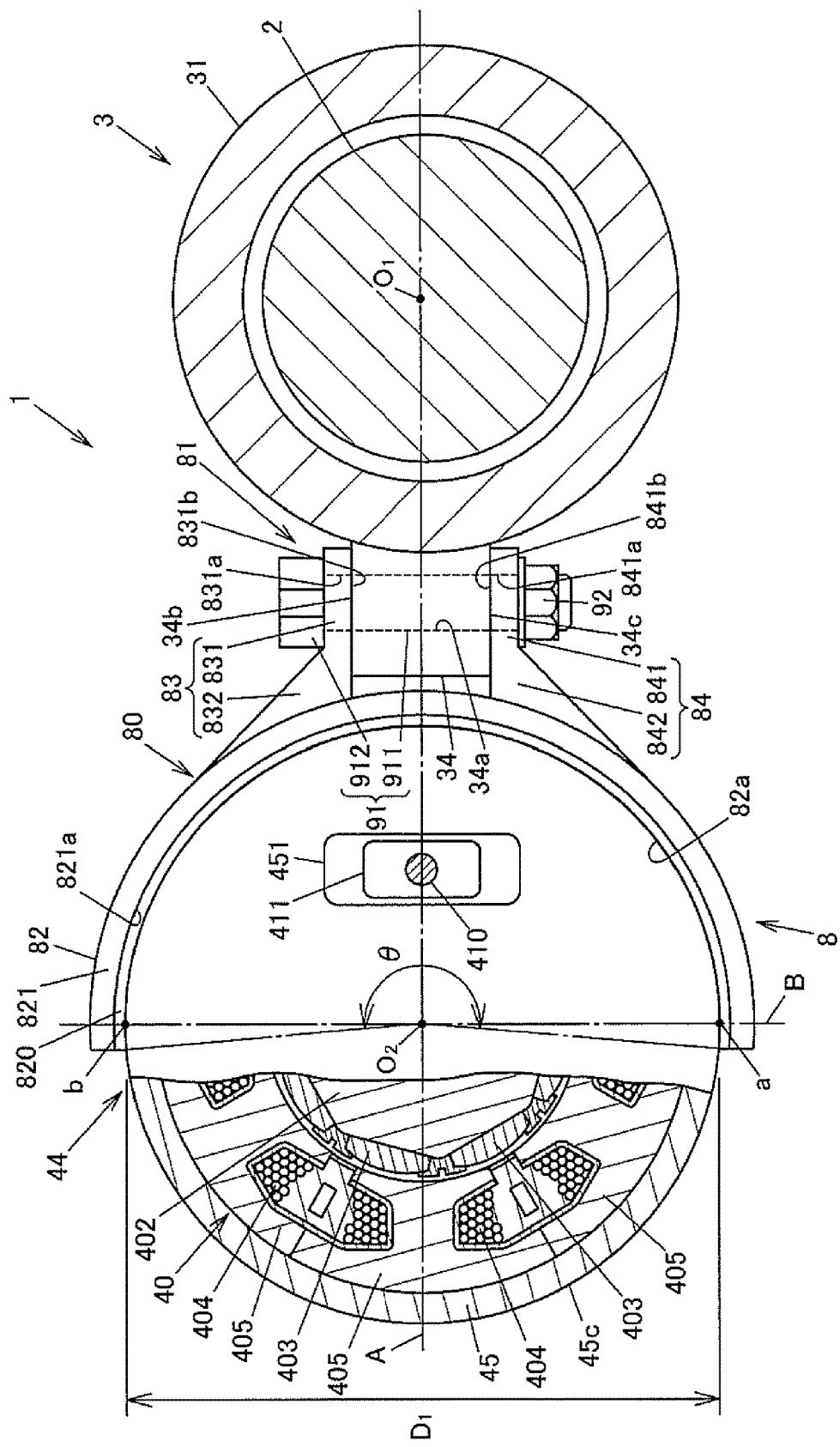
FIG. 4 is a schematic view illustrating a fixing state of a support member.
Figure 5:
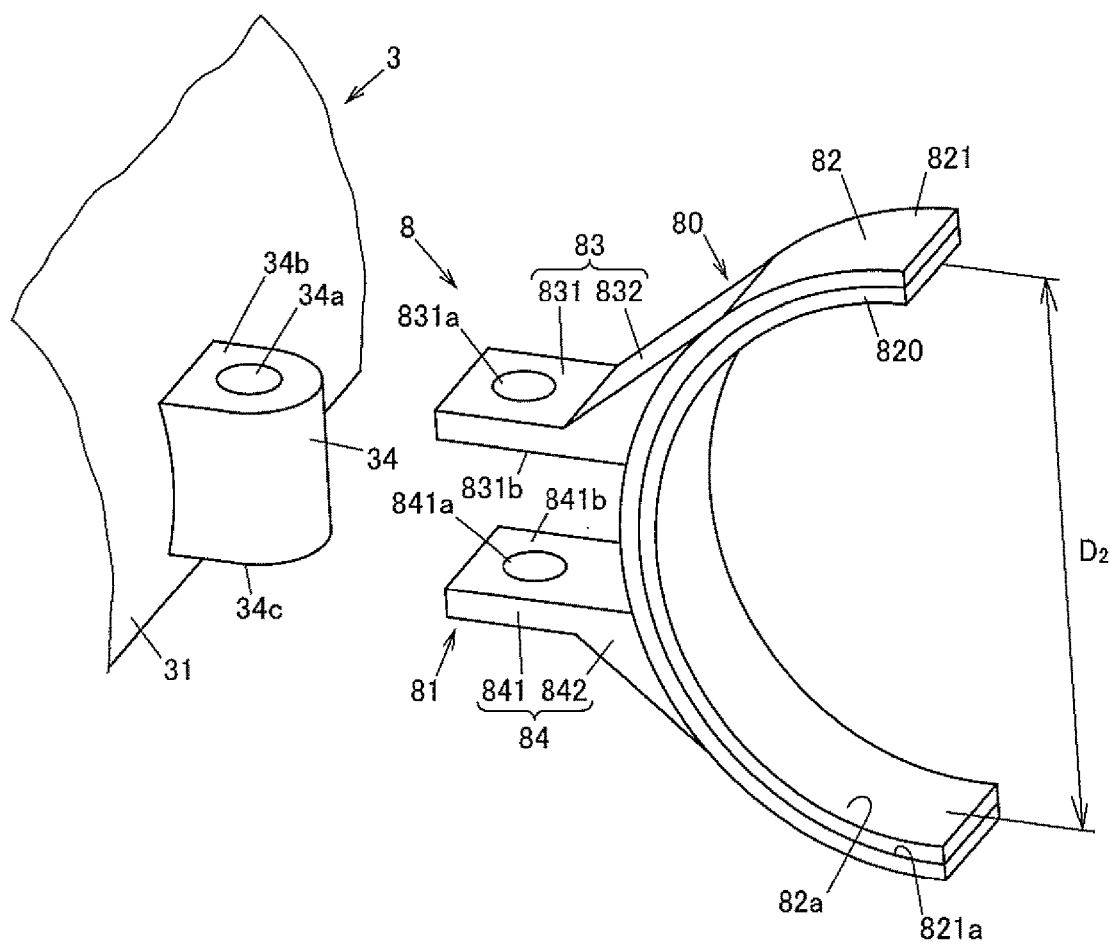
FIG. 5 is a perspective view of the support member and a part of the housing.

FIG. 4 is a configuration view showing a fixing state of the support member 8 in the steering device 1, along with cross-sections of the rack housing 3 and the rack shaft 2 along line A-A in FIG. 2. In FIG. 4, the motor unit 44 is partially broken to show the internal structure of the electric motor 40. FIG. 5 is a perspective view of the support member 8 and a part of the housing 3.

The electric motor 40 has a rotor core 402 that rotates integrally with the shaft 401, a plurality of permanent magnets 403 fixed to an outer circumferential surface of the rotor core 402, and a plurality of stator cores 405 around which windings 404 of multiple phases are respectively wound. The plurality of stator cores 405 is fixed to the motor case 45. As a motor current is supplied from the control unit 40a to the windings 404, an attractive force and a repulsive force are generated between the plurality of stator cores 405 and the plurality of permanent magnets 403, causing the shaft 401 and the rotor core 402 to rotate relative to the motor case 45.

The motor case 45 constituting a part of the motor unit 44 is disposed at a predetermined distance from the rack shaft housing section 31 of the rack housing 3. The steering device 1 includes the support member 8 that is fixed to the fixing projection 34 of the rack housing 3 and supports the motor case 45 (motor unit 44). The motor unit 44 having a relatively large mass can be fixed more firmly by being supported by both the coupling portion 45a and the support member 8. The motor case 45 has a shape of a one-end-closed cylinder: a part at which the motor case 45 is supported by the support member 8 has a cylindrical shape, and a bottom part of the motor case 45 to which the connector 451 is fixed has a disc shape.

The support member 8 has a fixing part 81 that is fixed to the fixing projection 34 of the rack housing 3, and an arc-shaped support part 82 that is disposed along an outer circumferential surface 45c of the motor case 45. The support member 8 is fixed to the rack housing 3 so as to support the motor case 45 at the end opposite from the coupling portion 45a. The support part 82 is in contact with the outer circumferential surface 45c of the motor case 45, but is not fixed to the motor case 45 by bolt fastening, bonding, etc.

In this embodiment, the support member 8 is fixed to the rack housing 3 by fastening the fixing part 81 to the fixing projection 34 with a bolt. The fixing projection 34 protrudes from the rack shaft housing section 31 toward the motor unit 44 along the vehicle length direction (the direction in which the rack housing 3 and the motor case 45 face each other). In this embodiment, the shaft 401 of the electric motor 40 is disposed so as to be horizontally offset relative to the rack shaft 2, and thus the direction in which the rack housing 3 and the motor case 45 face each other coincides with the vehicle length direction. A bolt hole 34a extending in the vehicle height direction is formed in the fixing projection 34. In this embodiment, the bolt hole 34a through which a shank 911 of the bolt 91 is passed extends through the fixing projection 34 in the vehicle height direction. Open end surfaces 34b, 34c which are located respectively at an upper end and a lower end of the fixing projection 34 and in which the bolt hole 34a opens are flat surfaces perpendicular to an extension direction of the bolt hole 34a.

The fixing part 81 has a pair of fixing pieces 83, 84 that protrudes from the support part 82 toward the rack shaft housing section 31. The pair of fixing pieces 83, 84 is provided so as to sandwich the fixing projection 34 in a direction perpendicular to both the direction parallel to the rack shaft 2 (vehicle lateral direction) and the direction in which the rack housing 3 and the motor case 45 face each other (vehicle length direction). Hereinafter, of the pair of fixing pieces 83, 84, the fixing piece 83 located on the upper side will be referred to as a first fixing piece 83, and the fixing piece 84 located on the lower side will be referred to as a second fixing piece 84.

The first fixing piece 83 has a flat plate part 831 having an elongated plate shape, and a reinforcing part 832 provided between the flat plate part 831 and the support part 82. The flat plate part 831 has a shape of an elongated plate with a longitudinal direction oriented in the vehicle length direction, and a leading end of the flat plate part 831 on the side of the rack shaft housing section 31 is fastened with the bolt to the open end surface 34b of the fixing projection 34 in which the bolt hole 34a opens. The reinforcing part 832 has a substantially triangular shape as seen along a central axis $O_2$ of the electric motor 40, and is provided between a portion of the flat plate part 831 on the side of a base end thereof and an outer circumferential surface of the support part 82.

Similarly, the second fixing piece 84 has a flat plate part 841 having an elongated plate shape, and a reinforcing part 842 provided between the flat plate part 841 and the support part 82. The flat plate part 841 has a shape of an elongated plate with a longitudinal direction oriented in the vehicle length direction, and a leading end of the flat plate part 841 on the side of the rack shaft housing section 31 is fastened with the bolt to the open end surface 34c of the fixing projection 34 in which the bolt hole 34a opens. The reinforcing part 842 has a substantially triangular shape as seen along the central axis $O_2$ of the electric motor 40, and is provided between a portion of the flat plate part 841 on the side of a base end thereof and the outer circumferential surface of the support part 82.

The flat plate part 831 of the first fixing piece 83 and the flat plate part 841 of the second fixing piece 84 are parallel to each other, and a distance therebetween is substantially equal to the width of the fixing projection 34 in the height direction. The reinforcing part 832 of the first fixing piece 83 is provided on the upper side of the flat plate part 831, and the reinforcing part 842 of the second fixing piece 84 is provided on the lower side of the flat plate part 841.

A bolt pass-through hole 831a through which the shank 911 of the bolt 91 is passed is formed in the flat plate part 831 of the first fixing piece 83. A bolt pass-through hole 841a through which the shank 911 of the bolt 91 is passed is formed in the flat plate part 841 of the second fixing piece 84. The bolt 91 is passed from the upper side, sequentially through the bolt pass-through hole 831a extending through the first fixing piece 83, the bolt hole 34a of the fixing projection 34, and the bolt pass-through hole 841a extending through the second fixing piece 84. A head 912 of the bolt 91 comes in contact with the first fixing piece 83, and a nut 92 is engaged on the shank 911 of the bolt 91 protruding downward through the pass-through hole 841a of the second fixing piece 84.

The support member 8 is fixed to the rack housing 3 (rack shaft housing section 31) as the fixing projection 34 and the first and second fixing pieces 83, 84 are fastened and fixed together with the bolt 91 and the nut 92. A surface 831b of the flat plate part 831 of the first fixing piece 83 that faces the second fixing piece 84 is brought into contact with the open end surface 34b of the fixing projection 34 by an axial force of the bolt 91. A surface 841b of the flat plate part 841 of the second fixing piece 84 that faces the first fixing piece 83 is brought into contact with the open end surface 34c of the fixing projection 34 by the axial force of the bolt 91.

Alternatively, the bolt 91 may be passed from the lower side, sequentially through these holes, i.e., from the bolt pass-through hole 841a extending through the second fixing piece 84, via the bolt hole 34a of the fixing projection 34, to the bolt pass-through hole 831a of the first fixing piece 83. In this case, the nut 92 is engaged on the shank 911 of the bolt 91 protruding upward through the bolt pass-through hole 831a extending through the first fixing piece 83.

The bolt hole 34a of the fixing projection 34 may be formed as an internally threaded hole, and the first fixing piece 83 and the second fixing piece 84 may be fixed to the fixing projection 34 with two bolts that engage in the bolt hole 34a from the upper and lower sides. In this case, a first bolt is passed through the bolt pass-through hole 831a of the first fixing piece 83 and engaged in the bolt hole 34a, while a second bolt is passed through the bolt pass-through hole 841a of the second fixing piece 84 and engaged in the bolt hole 34a. Alternatively, the bolt pass-through hole 841a of the second fixing piece 84 may be formed as an internally threaded hole, and the bolt 91 may be passed through the bolt hole 34a of the fixing projection 34 from the bolt pass-through hole 831a of the first fixing piece 83 and engaged in the bolt pass-through hole 841a of the second fixing piece 84. Conversely, the bolt pass-through hole 831a of the first fixing piece 83 may be formed as an internally threaded hole, and the bolt 91 may be passed through the bolt hole 34a of the fixing projection 34 from the bolt pass-through hole 841a of the second fixing piece 84 and engaged in the bolt pass-through hole 831a of the first fixing piece 83.

In the steering device 1, especially shaking of the motor unit 44 in the vehicle height direction and the vehicle length direction is problematic. By sandwiching the fixing projection 34 between the first and second fixing pieces 83, 84 in the vehicle height direction, and fastening and fixing these fixing projection 34 and first and second fixing pieces 83, 84 together with the bolt 91, it is possible to restrain the movement of the support member 8 in the vehicle height direction and the vehicle length direction, and thereby restrict the shaking of the motor unit 44 in the vehicle height direction and the vehicle length direction. In the steering device 1, the rack housing 3 and the motor case 45 are coupled together in the vehicle lateral direction, and this structure makes the motor unit 44 essentially less likely to shake in the vehicle lateral direction. Therefore, loosening of the bolt 91 due to turning of the support member 8 around the bolt 91 as the axis etc. can also be avoided.

The support part 82 has an arc shape extending along the outer circumferential surface 45c of the motor case 45, and the inside diameter of the support part 82 is substantially equal to the outside diameter of the motor case 45. A central angle $\theta$ of the support part 82 is not smaller than 180 degrees, and thus the support part 82 supports the motor case 45 along an area of the outer circumferential surface 45c not smaller than half the circumference thereof. To fit the support part 82 on the motor case 45, the support part 82 is elastically deformed so as to increase the diameter, and the motor case 45 is fitted and disposed inside the support part 82. Thus, without being fixed with bolts to the motor case 45, the support member 8 can reliably support the motor case 45.

When the central angle $\theta$ of the support member 8 is too large, it is difficult to mount the support part 82 on the motor case 45. It is therefore preferable that the central angle $\theta$ of the support member 8 be 180 degrees, or an angle somewhat larger than 180 degrees (e.g., not larger than 200 degrees). When the central angle $\theta$ is larger than 180 degrees, the motor case 45 is restrained from slipping out of the support part 82 even when the motor case 45 shakes in the direction of the bisector of the central angle $\theta$.

To reduce the shaking of the motor unit 44 in the vehicle height direction, it is preferable that the support member 8 be mounted on the rack housing 3 such that the support part 82 supports the motor case 45 at least at both ends in a direction orthogonal to an imaginary plane A including a central axis $O_1$ of the rack shaft and the central axis $O_2$ of the electric motor 40 (in the vehicle height direction). In other words, it is preferable that the support part 82 support the motor case 45 along an area including at least two intersection points a, b at which the outer circumferential surface 45c intersects with a plane B that is orthogonal to the plane A and passes through the central axis $O_2$.

Moreover, it is desirable that the support part 82 has a vertically symmetrical shape such that a load exerted by shaking in the vehicle height direction can be borne by the support part 82 in a balanced manner. Specifically, it is desirable that the support member 8 be fixed to the rack housing 3 with the support part 82 and the fixing part 81 formed such that the support part 82 is symmetrical relative to the plane A including the central axis $O_1$ of the rack shaft 2 and the central axis $O_2$ of the electric motor 40. To avoid uneven loading, it is desirable that the fixing part 81 and the fixing projection 34 also have a symmetrical shape relative to the plane A.

A material that is elastically deformable and has such mechanical strength as can sufficiently reduce the shaking of the motor unit 44 is preferably used as the material of the support member 8. In this embodiment, the support member 8 is composed of a rubber sheet 820 made of synthetic rubber and a stiff member 80 made of a resin having higher stiffness than the rubber sheet 820. Thus, in this embodiment, a surface of the support part 82 that comes in contact with the outer circumferential surface 45c of the motor case 45 is made of rubber. The stiff member 80 integrally has the fixing part 81 and an arc-shaped arc part 821, and the rubber sheet 820 is provided along an inner circumferential surface 821a of the arc part 821. Thus, the fixing part 81 is a part of the stiff member 80, and the support part 82 is composed of the arc part 821 that is a part of the stiff member 80 and of the rubber sheet 820.

The rubber sheet 820 serves to reduce abnormal noise by being interposed between the motor case 45 and the stiff member 80 (arc part 821). The stiff member 80 has the sufficient stiffness to support the motor case 45. Although the case where the stiff member 80 made of resin is used for the support member 8 has been described here, the part corresponding to the stiff member 80 may instead be composed of a metal member, such as an aluminum alloy. In this case, it is more desirable that the rubber sheet 820 be provided to reduce abnormal noise. For example, the thickness of the rubber sheet 820 is 1 to 2 mm.

In the steering device 1, an inside diameter $D_2$ of the support part 82 in a natural state where the support part 82 is not supporting the motor case 45 (the inside diameter of the rubber sheet 820 mounted on the arc part 821) is not larger than an outside diameter $D_1$ of the motor case 45. Thus, the motor case 45 can be supported by using the elasticity of the support part 82. It is more desirable that the inside diameter $D_2$ of the support part 82 in the natural state be smaller than the outside diameter $D_1$ of the motor case 45. In this case, an inner circumferential surface 82a of the arc part 821 is pressed against the outer circumferential surface 45c of the motor case 45 by a restorative force of the elastically deformed support part 82, so that the motor case 45 can be supported more firmly without backlash.

The first embodiment having been described above can achieve the following workings and effects.

(1) The support member 8 has the fixing part 81 composed of the first and second fixing pieces 83, 84 that protrude from the support part 82 toward the rack shaft housing section 31, and the first and second fixing pieces 83, 84 are fastened with the bolt to the open end surfaces 34b, 34c of the fixing projection 34 that has the bolt hole 34a and protrudes from the rack shaft housing section 31 toward the motor unit 44. Thus, the support member 8 is less likely to be subjected to stress concentration at the first and second fixing pieces 83, 84 or to be damaged at the first and second fixing pieces 83, 84, and can appropriately restrain the shaking of the motor unit 44.

(2) The fixing part 81 has the pair of fixing pieces 83, 84 that is provided so as to sandwich the fixing projection 34 in the vehicle height direction, and the fixing part 81 is fixed to the rack housing 3 with the bolt 91 passed through the bolt pass-through holes 831a, 841a extending through the pair of fixing pieces 83, 84 and the bolt hole 34a extending through the fixing projection 34. Thus, the support member 8 is less likely to be displaced by shaking in the vehicle height direction and the vehicle length direction, and therefore can firmly support the motor unit 44. Moreover, the bolt 91 is less likely to loosen in the steering device 1, since shaking (of the motor unit 44 relative to the rack housing 3) in the vehicle lateral direction is less likely to occur.

(3) The central angle θ of the support part 82 is not smaller than 180 degrees. Thus, it is possible to reliably support the motor case 45 (motor unit 44) by the support member 8 without fixing the support part 82 with bolts to the motor case 45. As a result, a steering device 1 that has a smaller number of components and is easy to assemble can be realized.

(4) The support part 82 of the support member 8 supports the motor case 45 along an area including both ends (intersection points a, b) in the direction orthogonal to the plane A including the central axis $O_1$ of the rack shaft and the central axis $O_2$ of the electric motor 40. Thus, the motor unit 44 can be appropriately restrained from shaking in the direction perpendicular to the plane A, i.e., the vehicle height direction.

(5) The inside diameter $D_2$ of the support part 82 when not supporting the motor case 45 is not larger than the outside diameter $D_1$ of the motor case 45. Thus, the motor case 45 can be reliably supported by the support part 82 so as to reduce the shaking thereof in the vehicle height direction.

MODIFIED EXAMPLES OF FIRST EMBODIMENT

Figure 6:
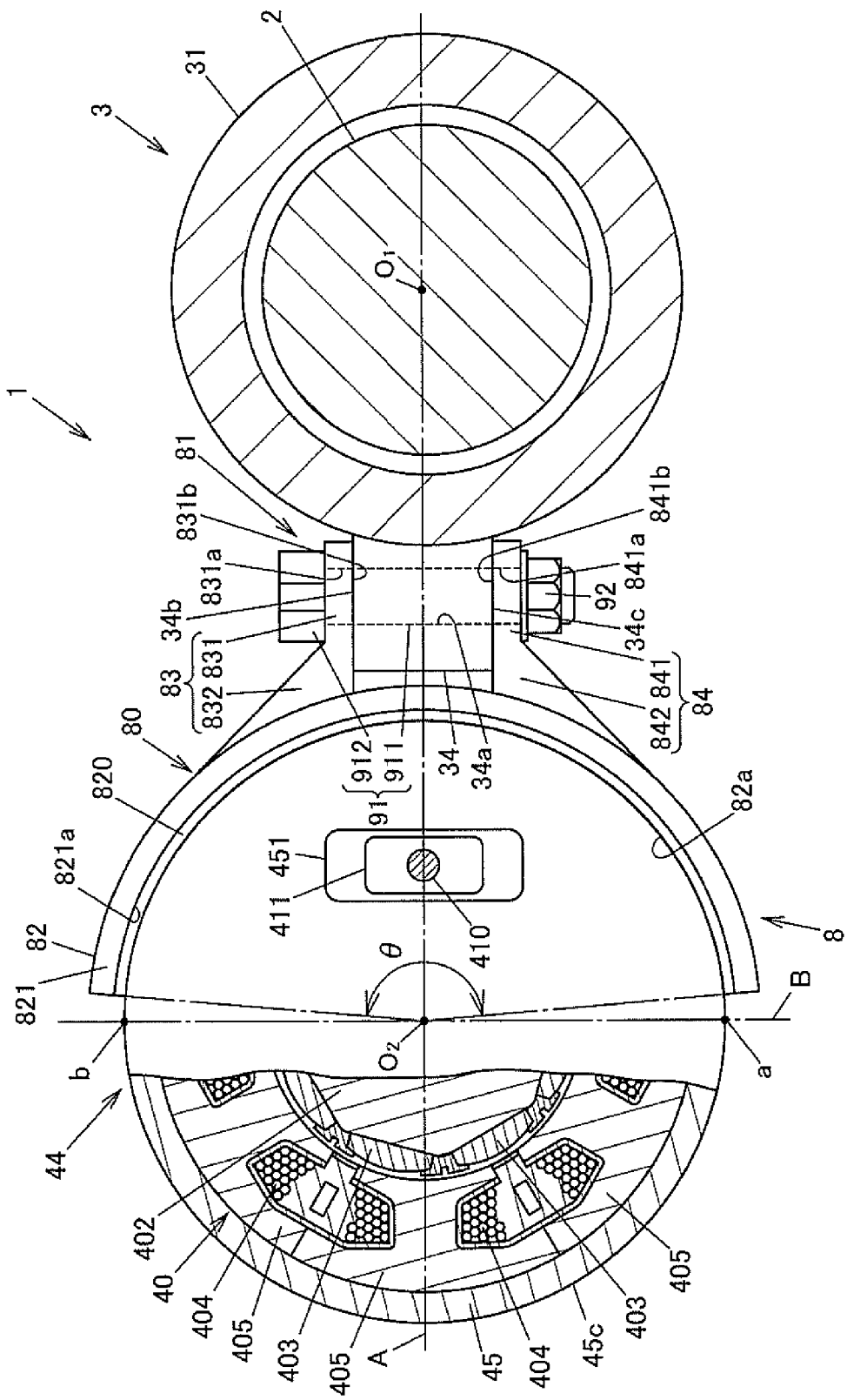
FIG. 6 is a view illustrating a first modified example of the first embodiment.
Figure 7:
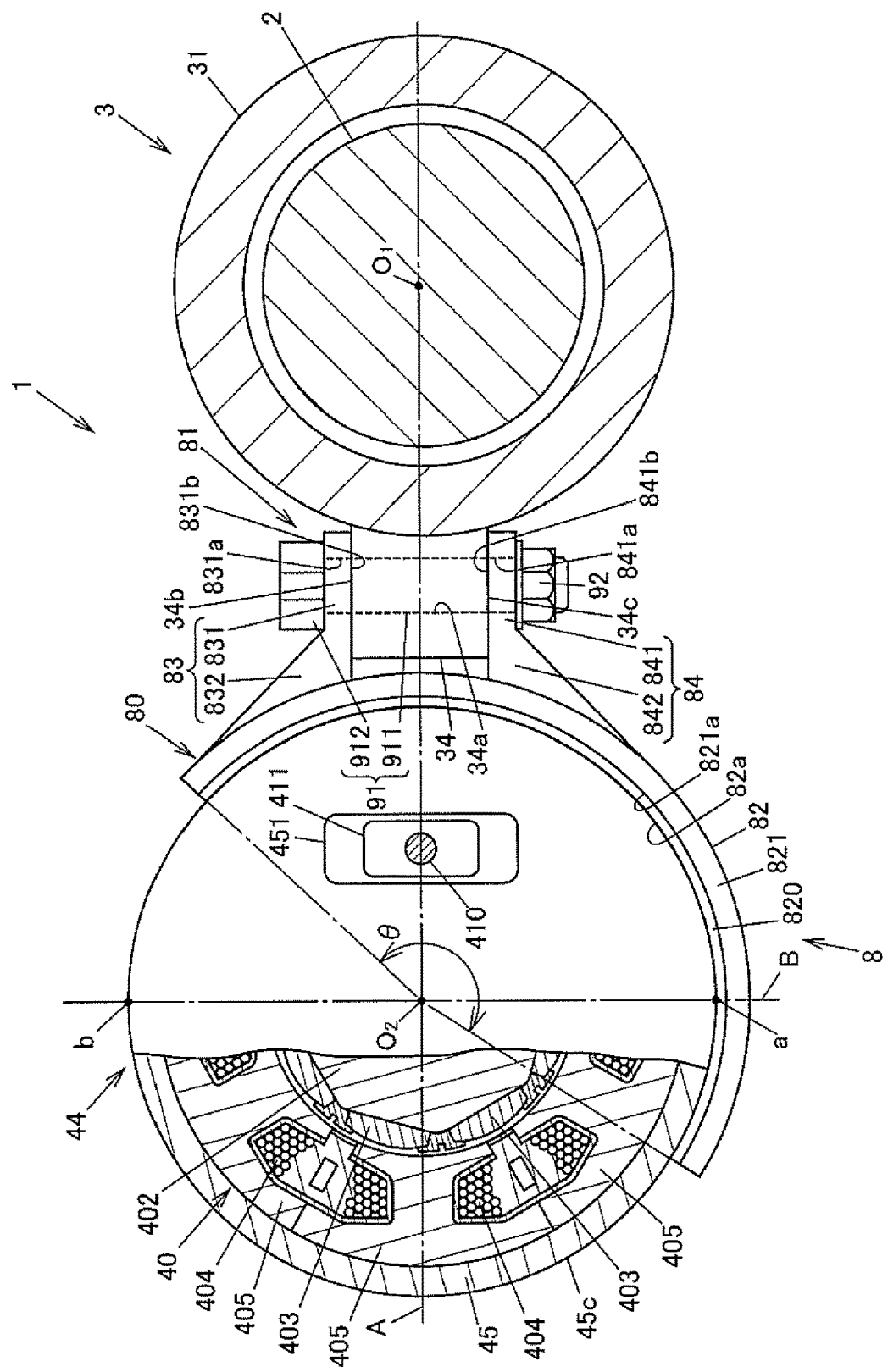
FIG. 7 is a view illustrating a second modified example of the first embodiment.

Next, modified examples of the first embodiment of the present invention will be described with reference to FIG. 6 and FIG. 7. FIG. 6 shows a first modified example, and FIG. 7 shows a second modified example. These modified examples are different from the first embodiment described with reference to FIG. 4 etc. in the shape of the support part 82 of the support member 8 but otherwise the same as the first embodiment. Therefore, only this different part will be described. In the following description, the names and reference signs of the members etc. used in the first embodiment will be used.

The central angle θ of the support part 82 is not smaller than 180 degrees in the first embodiment, but the central angle θ of the support part 82 is smaller than 180 degrees in the first and second modified examples. In the first modified example, the support part 82 supports the motor case 45 only at a part farther on the side of the rack housing 3 than the plane B, and does not support the motor case 45 at the intersection point b corresponding to the lower end thereof. On the other hand, in the second modified example, the length of the arc of the support part 82 on the lower side from the plane A is larger than the length of the arc of the support part 82 on the upper side from the plane A, and the support part 82 supports the motor case 45 at the intersection point b corresponding to the lower end thereof. It is desirable that the central angle θ of the support part 82 be not smaller than 90 degrees.

In the first and second modified examples, the support part 82 is in contact with the outer circumferential surface 45c of the motor case 45 but is not fixed to the motor case 45 by bolt fastening, bonding, etc. as in the first embodiment. Although the central angle θ of the support part 82 is smaller than 180 degrees in the first and second modified examples, when the motor unit 44 shakes in the vehicle height direction or the vehicle length direction, the support part 82 can reduce the amplitude (the width of shaking) by supporting the motor case 45 at least on one side of the amplitude (one side in a shaking direction in a case where the central axis $O_2$ constitutes the center of amplitude).

These modified examples can achieve workings and effects similar to (1) and (2) described in the first embodiment. Since the central angle θ of the support part 82 is smaller than 180 degrees, the support member 8 can be mounted without deforming the support part 82. Therefore, even when the stiff member 80 is composed of metal having higher stiffness than resin, the support member 8 can be easily mounted. Furthermore, according to the second modified example, the support part 82 supports the motor case 45 at the lower end, and the weight of the motor unit 44 can be appropriately borne by the support part 82, so that the motor unit 44 can be effectively restrained from shaking in the vehicle height direction.

Figure 9:
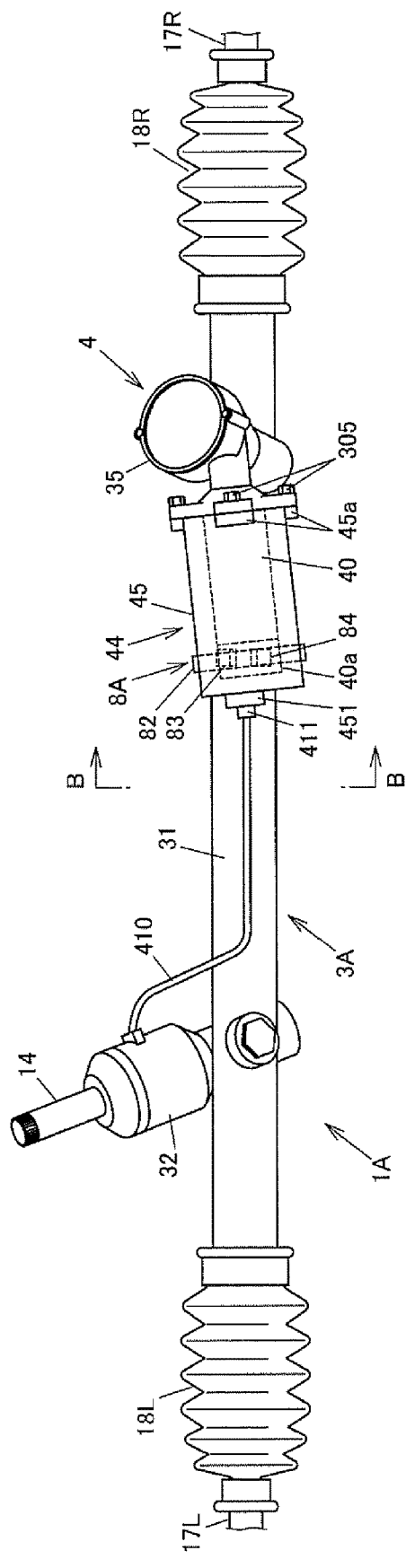
FIG. 9 is a configuration view showing the steering device as seen from a vehicle rear side.
Figure 10:
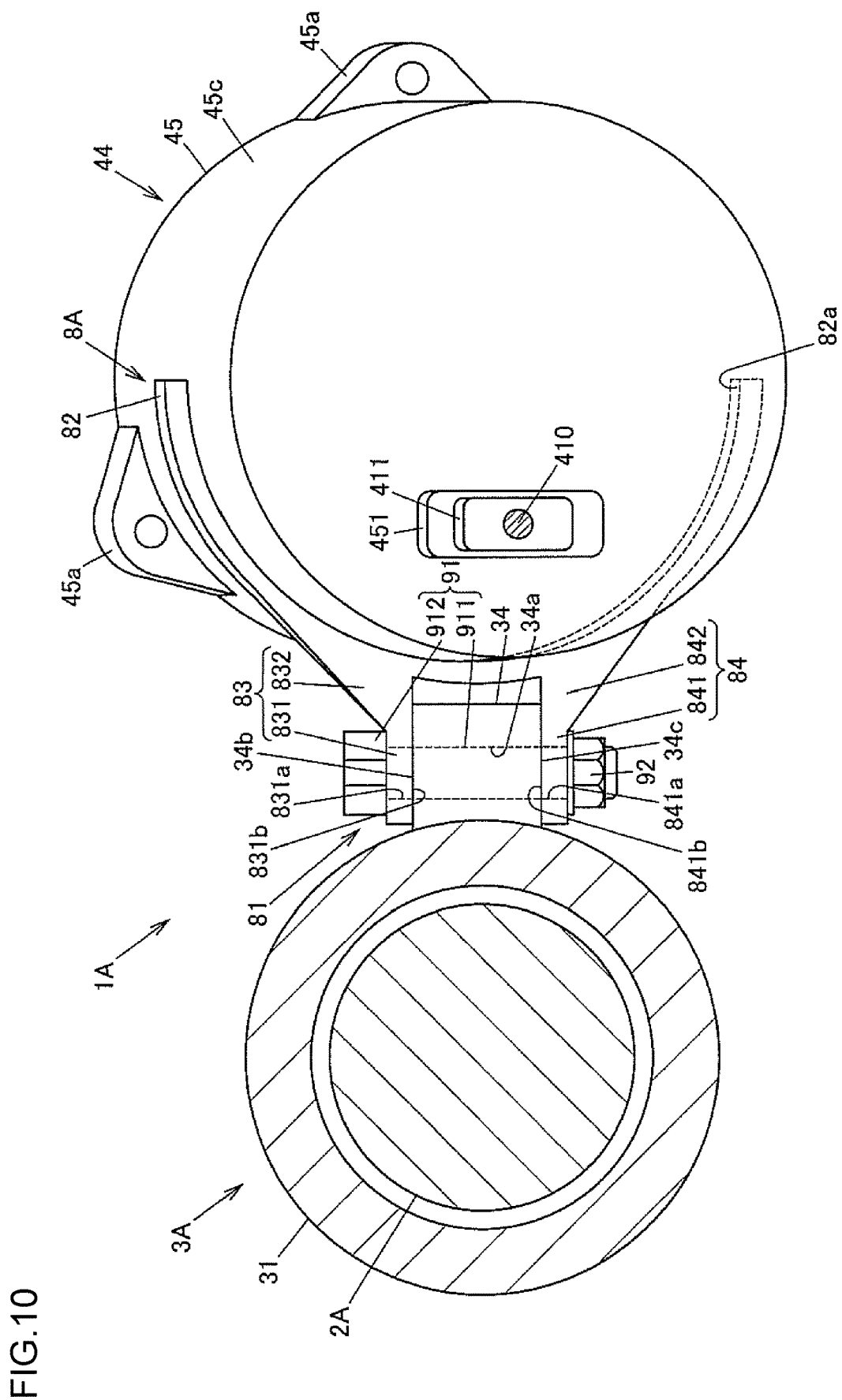
FIG. 10 is a configuration view showing a motor unit cut along line B-B in FIG. 9.

Next, a second embodiment of the present invention will be described with reference to FIG. 8 to FIG. 10.

Figure 8:
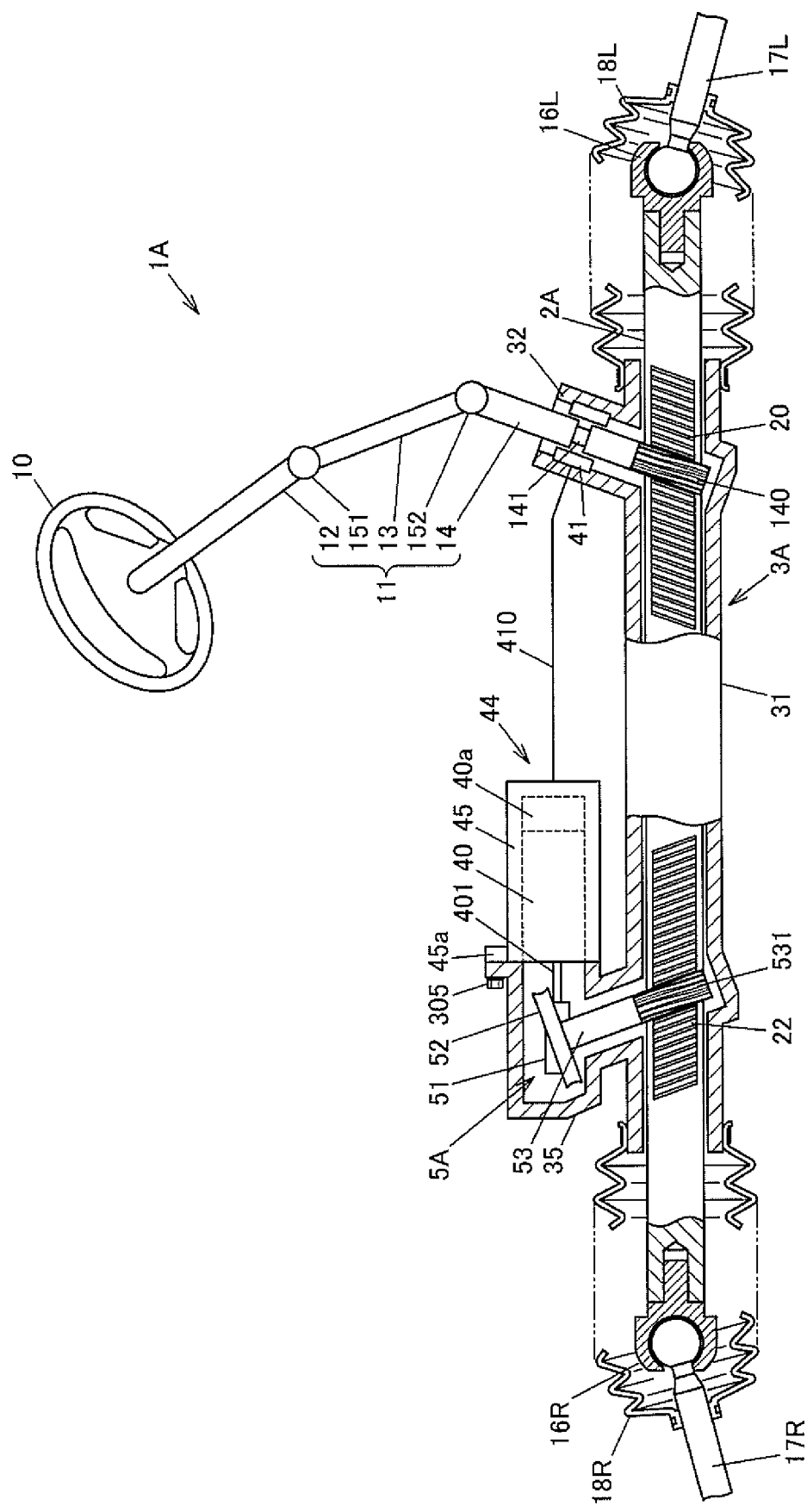
FIG. 8 is a schematic view showing the configuration of a steering device according to a second embodiment.

FIG. 8 is a schematic view schematically showing the configuration of a steering device 1A according to the second embodiment. FIG. 9 is a configuration view of the steering device 1A as seen from a vehicle rear side. FIG. 10 is a configuration view showing the motor unit 44 of the steering device 1A along with cross-sections of the rack housing 3 and the rack shaft 2A along line B-B in FIG. 9. In FIG. 8 to FIG. 10, those members, parts, etc. that are common with the first embodiment will be denoted by the same reference signs as used in the first embodiment, and overlapping description will be omitted.

In the first embodiment, the case where the moving force application mechanism 5 is formed by a ball screw mechanism has been described. In this embodiment, a moving force application mechanism 5A is formed by a rack-and-pinion mechanism. Specifically, the moving force application mechanism 5A is composed of a worm gear 51 joined to the shaft 401 of the electric motor 40 so as to rotate integrally with the shaft 401, a worm wheel 52 meshing with the worm gear 51, and a pinion shaft 53 joined to the worm wheel 52 so as to rotate integrally with the worm wheel 52.

Pinion teeth 531 are formed at a leading end of the pinion shaft 53. Instead of the groove 21 of the first embodiment, rack teeth 22 meshing with the pinion teeth 531 are formed in a rack shaft 2A. When the shaft 401 of the electric motor 40 rotates, this rotation is transmitted to the pinion shaft 53 while the speed of the rotation is reduced, and a moving force acting in the axial direction is applied to the rack shaft 2A as a steering assisting force.

A rack housing 3A has the rack shaft housing section 31, the pinion shaft housing section 32, and a moving force application mechanism housing section 35 housing the moving force application mechanism 5A. A plurality of coupling portions 45a formed at one end of the motor case 45 is fixed respectively with bolts 305 to the moving force application mechanism housing section 35. The motor unit 44 is not parallel to the rack shaft 2A but is inclined relative to a horizontal direction such that an end of the motor unit 44 opposite from the coupling portions 45a is located farther on the lower side than an end on the side of the coupling portions 45a.

In the first embodiment, both the arrangement direction of the first fixing piece 83 and the second fixing piece 84 and the arrangement direction of an upper end and a lower end of the support part 82 are oriented in the vehicle height direction. On the other hand, in this embodiment, the arrangement direction of the first fixing piece 83 and the second fixing piece 84 is oriented in the vehicle height direction, but the arrangement direction of the upper end and the lower end of the support part 82 is inclined relative to the vehicle height direction. The angle of this inclination of the support part 82 corresponds to the angle of inclination of the motor unit 44, and the support part 82 extends in the circumferential direction of the motor case.

In the first embodiment, the case where the central angle of the support member 8 is larger than 180 degrees and the support member 8 is composed of the stiff member 80 and the rubber sheet 820 has been described. In this embodiment, the central angle of a support member 8A is 180 degrees, and the entire support member 8A is formed by an integral resin member having the fixing part 81 (first and second fixing pieces 83, 84) and the support part 82.

The support part 82 of the support member 8A supports the motor case 45 along an area that corresponds to half the circumference of the outer circumferential surface 45c and is located farther on the side of the housing 3A than the central axis of the electric motor 40. Thus, the support member 8A supports the motor case 45 at both ends in the vehicle height direction. The structure of fastening together the fixing part 81 of the support member 8A and the fixing projection 34 is the same as in the first embodiment. To avoid creating clearance between the inner circumferential surface 82a of the support part 82 and the outer circumferential surface 45c of the motor case 45, the inside diameter of the support part 82 (the distance between both ends in the circumferential direction) in the natural state is set to be slightly smaller than the outside diameter of the motor case 45, and the inner circumferential surface 82a is brought into contact with the outer circumferential surface 45c of the motor case 45 by elastically deforming the support part 82 so as to increase the diameter.

The second embodiment having been described above can achieve workings and effects similar to those of the first embodiment. The support member 8A according to the second embodiment may be modified as in the first and second modified examples described with reference to FIG. 6 and FIG. 7.

All the combinations of the features described in the embodiments are not essential as the means for achieving the object of the present invention. The present invention can be implemented with modifications appropriately made thereto within the scope of the gist of the invention.

For example, in the above embodiments, the case where the control unit 40a is housed in the motor case 45 of the motor unit 44 has been described. However, the present invention is not limited to this example, and the control unit 40a need not be housed in the motor case 45. In this case, the electric motor 40 is supplied with a motor current from a control device that is fixed separately to the vehicle body.

In the above embodiments, the case where the rack housing 3 or 3A and the motor unit 44 are disposed side by side horizontally in the vehicle length direction has been described, but the present invention is not limited to this example. For example, the motor unit 44 may be disposed at a position shifted upward or downward relative to the rack housing 3 or 3A.

In the above embodiments, the case where the fixing part 81 has the first and second fixing pieces 83, 84 has been described, but the present invention is not limited to this example. The fixing part 81 may have only the first fixing piece 83 or only the second fixing piece 84. In other words, the support member 8 or 8A may have only one fixing piece (the first fixing piece 83 or the second fixing piece 84) that protrudes from the support part 82 toward the rack shaft housing section 31. Also in this case, the support member 8 or 8A is less likely to be subjected to stress concentration at this one fixing piece, and can appropriately restrain the shaking of the motor unit 44.

What is claimed is:
1. A steering device comprising:
a steering axle that steers steered wheels of a vehicle by advancing and retracting in an axial direction;
a housing having a cylindrical main part that houses a part of the steering axle;
a motor unit that is disposed at a predetermined distance from the main part of the housing, and has a motor case of which one end in a direction parallel to the steering axle is fixed to the housing;

a moving force application mechanism that applies a moving force acting in the axial direction to the steering axle resulting from rotation of an output shaft of the motor unit; and a support member that is fixed to a fixing projection provided on the housing and supports the motor case, wherein the fixing projection protrudes from the main part toward the motor unit, and has a bolt hole extending in a height direction of the vehicle, wherein the support member has an arc-shaped support part that is disposed along an outer circumferential surface of the motor case, and a fixing piece that protrudes from the support part toward the main part of the housing, and an end of the fixing piece is fastened with a bolt to an open end surface of the fixing projection in which the bolt hole opens, and wherein the fixing piece comes in contact with the open end surface in which the bolt hole opens, an axis of the bolt hole along which the bolt passes being (i) perpendicular to a direction parallel to the steering axle and (ii) perpendicular to a direction in which the housing and the motor case face each other.

2. The steering device according to claim 1, wherein the bolt hole is formed so as to extend through the fixing projection, and the support member has a pair of the fixing pieces so as to sandwich the fixing projection along an axial direction of the bolt hole, and the pair of fixing pieces is fastened to the fixing projection with a bolt passed through the bolt hole.

3. The steering device according to claim 1, wherein a central angle of the support part is not smaller than 180 degrees.

4. The steering device according to claim 3, wherein the support part supports the motor case at least at both ends in a direction orthogonal to a plane including a central axis of the steering axle and a central axis of the electric motor.

5. The steering device according to claim 3, wherein an inside diameter of the support part when not supporting the motor case is not larger than an outside diameter of the motor case.

6. The steering device according to claim 1, wherein a central angle of the support part is smaller than 180 degrees.

7. The steering device according to claim 1, wherein the support part supports the motor case at least at a lower end.

8. The steering device according to claim 1, wherein a surface of the support part that comes in contact with an outer circumferential surface of the motor case is made of rubber.

* * * * *